(12) United States Patent
Kuo et al.

(10) Patent No.: US 7,480,011 B2
(45) Date of Patent: Jan. 20, 2009

(54) VIDEO PROCESSING CHIP CAPABLE OF ADJUSTING ASPECT RATIO AND METHOD OF DISPLAYING AN IMAGE THEREBY

(75) Inventors: Min-Chien Kuo, Lugang Township, Changhua County (TW); Chi-Mao Hung, Chiayi (TW)

(73) Assignee: Au Optronics Corp., Hsin-chu (TW)

( * ) Notice: Subject to any disclaimer, the term of this patent is extended or adjusted under 35 U.S.C. 154(b) by 573 days.

(21) Appl. No.: 11/175,147

(22) Filed: Jul. 7, 2005

(65) Prior Publication Data

US 2006/0187352 A1 Aug. 24, 2006

(30) Foreign Application Priority Data

Feb. 18, 2005 (TW) .............................. 94104971 A

(51) Int. Cl.
H04N 5/46 (2006.01)
(52) U.S. Cl. ....................................... 348/558; 348/913
(58) Field of Classification Search .................. 348/558, 348/445, 913, 556, 441
See application file for complete search history.

(56) References Cited

U.S. PATENT DOCUMENTS

| | | | | | |
|---|---|---|---|---|---|
| 5,581,304 | A | * | 12/1996 | Wang ........................ | 348/558 |
| 5,617,147 | A | * | 4/1997 | Ezaki ........................ | 348/461 |
| 5,638,485 | A | * | 6/1997 | Kobayashi et al. .......... | 386/123 |
| 5,912,710 | A | | 6/1999 | Fujimoto et al. | |
| 5,973,749 | A | * | 10/1999 | Ishii et al. .................. | 348/558 |
| 6,208,385 | B1 | * | 3/2001 | Konishi et al. .............. | 348/558 |
| 6,340,992 | B1 | * | 1/2002 | Markandey ................. | 348/556 |
| 7,079,192 | B1 | * | 7/2006 | Wysocki et al. ............. | 348/558 |
| 7,339,627 | B2 | * | 3/2008 | Schoner et al. ............. | 348/558 |
| 2003/0128292 | A1 | | 7/2003 | Kitamura et al. | |
| 2004/0006767 | A1 | | 1/2004 | Robson et al. | |
| 2004/0114907 | A1 | | 6/2004 | Rinaldi | |
| 2004/0117840 | A1 | | 6/2004 | Boudreau et al. | |

FOREIGN PATENT DOCUMENTS

| | | |
|---|---|---|
| TW | 535413 | 6/2003 |
| TW | 550956 | 9/2003 |
| WO | WO-2004/084535 | 9/2004 |

* cited by examiner

*Primary Examiner*—Paulos M Natnael
(74) *Attorney, Agent, or Firm*—Rabin & Berdo, PC

(57) ABSTRACT

A video processing chip capable of adjusting aspect ratio and a method of displaying an image thereby are provided. The video processing chip outputs an adjusted image signal according to a video signal to an LCD panel to display an image. The video processing chip includes a video processor, a ratio detector, a timing controller, and a multiplexer. The video processor generates an image signal according to the video signal. The ratio detector detects the aspect ratio of the video signal, and outputs a ratio control signal according to a ratio setting value. The timing controller outputs a vertical blanking signal, a horizontal blanking signal, and a blanking data in responding to the ratio control signal. The multiplexer selects the blanking data signal or the image signal as the adjusted image signal to be outputted, so that the displayed image has the aspect ratio corresponding to the ratio setting value.

19 Claims, 5 Drawing Sheets

VIDEO PROCESSING CHIP CAPABLE OF ADJUSTING ASPECT RATIO AND METHOD OF DISPLAYING AN IMAGE THEREBY

This application claims the benefit of Taiwan application Serial No. 94104971, filed Feb. 18, 2005, the subject matter of which is incorporated herein by reference.

BACKGROUND OF THE INVENTION

1. Field of the Invention

The invention relates in general to a video processing chip, and more particularly, to a video processing chip and a method of displaying an image thereby.

2. Description of the Related Art

Referring to FIG. 1, a structural diagram of a video processing system chip according to a conventional LCD display is shown. The video processing system chip 100 controls an LCD panel 130 to display an image according to a video signal Video. The video processing system chip 100 includes a video processor 110 and a timing controller 120. The video processing system chip 100 according to video signal Video outputs a control signal Sc, a red image signal R0, a green image signal G0 and a blue image signal B0. The timing controller 120 according to control signal Sc, outputs a data control signal Sd and a scan control signal Ss to the LCD panel 130. The LCD panel 130, under the control of the data control signal Sd and the scan control signal Ss, displays an image according to the red image signal R0, the green image signal G0 and the blue image signal B0.

A conventional LCD panel normally displays an image according to a aspect ratio of 4:3. Recently, LCD panel capable of displaying an aspect ratio of 16:9 has gained a significant market share. When the aspect ratio desired by the user is different from the original aspect ratio of the received video signal, for example, the original aspect ratio is 16:9 while the desired aspect ratio is 4:3, the user needs to couple an aspect ratio adjusting circuit in addition to the video processing system chip 100 for the original 16:9 image to be converted to a desired 4:3 image and outputted to the LCD panel. If another aspect ratio is desired, an aspect ratio of 3:2 for instance, the conventional method would dispose another aspect ratio adjusting circuit to convert the original 16:9 image into the desired 3:2 image. By doing so, except the video processing system chip 100, two aspect ratio adjusting circuits for generating images of various aspect ratios are needed, not only largely increasing manufacturing costs and occupying more circuit board space, but also increasing the volume of the LCD display due to the increase in circuit areas.

SUMMARY OF THE INVENTION

It is therefore an object of the present invention to provide a video processing chip and a method of displaying an image thereby. The video processing chip of the present invention integrates a video processor and a timing controller, and further incorporates a ratio detector and a multiplexer to be capable of generating images of various aspect ratios. The present invention reduces the area occupied by the circuit board and the required costs as well.

According to the object of the present invention, a video processing chip for receiving a video signal and accordingly outputting an adjusted red image signal, an adjusted green image signal and an adjusted blue image signal to an LCD panel to display an image is provided. The video processing chip includes a video processor, a ratio detector, a timing controller and a multiplexer. The video processor receives the video signal and generates the red image signal, the green image signal and the blue image signal accordingly. The ratio detector detects the aspect ratio of the video signal, and then outputs a ratio control signal according to a ratio setting value. The ratio setting value corresponds to a first aspect ratio, a second aspect ratio or a third aspect ratio. The timing controller outputs a vertical blanking signal, a horizontal blanking signal and a blanking data signal in response to the ratio control signal. The multiplexer receives the blanking data signal, the red image signal, the green image signal and the blue image signal. The multiplexer, under the control of the vertical blanking signal and the horizontal blanking signal, respectively selects the blanking data or the red image signal, the blanking data signal or the green image signal, and the blanking data signal or the blue image signal as the adjusted red image signal, the adjusted green image signal, and the adjusted blue image signal to be outputted, so that the image has an aspect ratio corresponding to the ratio setting value.

According to another object of the present invention, a method for displaying an image is provided. Firstly, a video signal is received, a red image signal, a green image signal and a blue image signal are generated accordingly, and an aspect ratio of the video signal is detected. Next, a ratio control signal is generated according to a ratio setting value. The ratio setting value corresponds to a first aspect ratio, a second aspect ratio and a third aspect ratio. Then, a vertical blanking signal, a horizontal blanking signal and a blanking data signal are generated in response to the ratio control signal. Lastly, under the control of the vertical blanking signal and the horizontal blanking signal, the blanking data or the red image signal, the blanking data signal or the green image signal, and the blanking data signal or the blue image signal are respectively selected as the adjusted red image signal, the adjusted green image signal, and the adjusted blue image signal to be outputted, so that the image has an aspect ratio corresponding to the ratio setting value.

Other objects, features, and advantages of the present invention will become apparent from the following detailed description of the preferred but non-limiting embodiments. The following description is made with reference to the accompanying drawings.

DETAILED DESCRIPTION OF THE INVENTION

Figure 1:
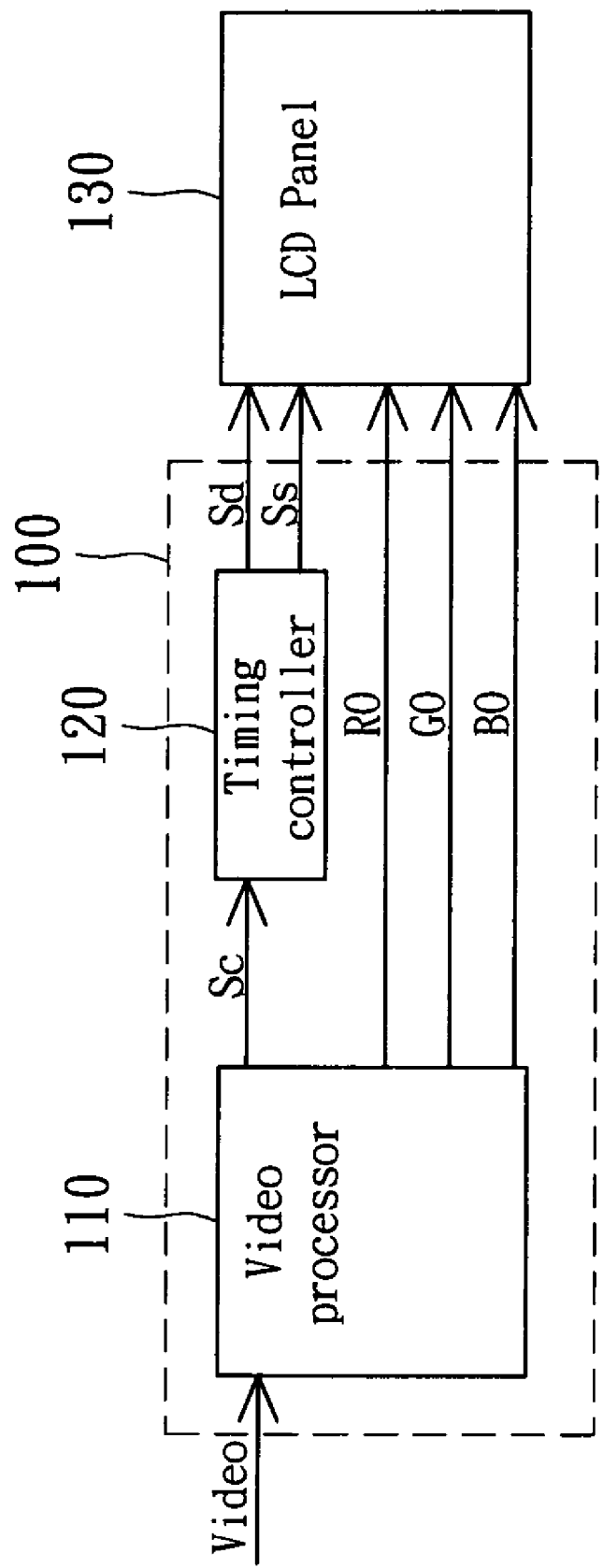
FIG. 1 is a structural diagram of a video processing system chip according to a conventional LCD display.
Figure 2:
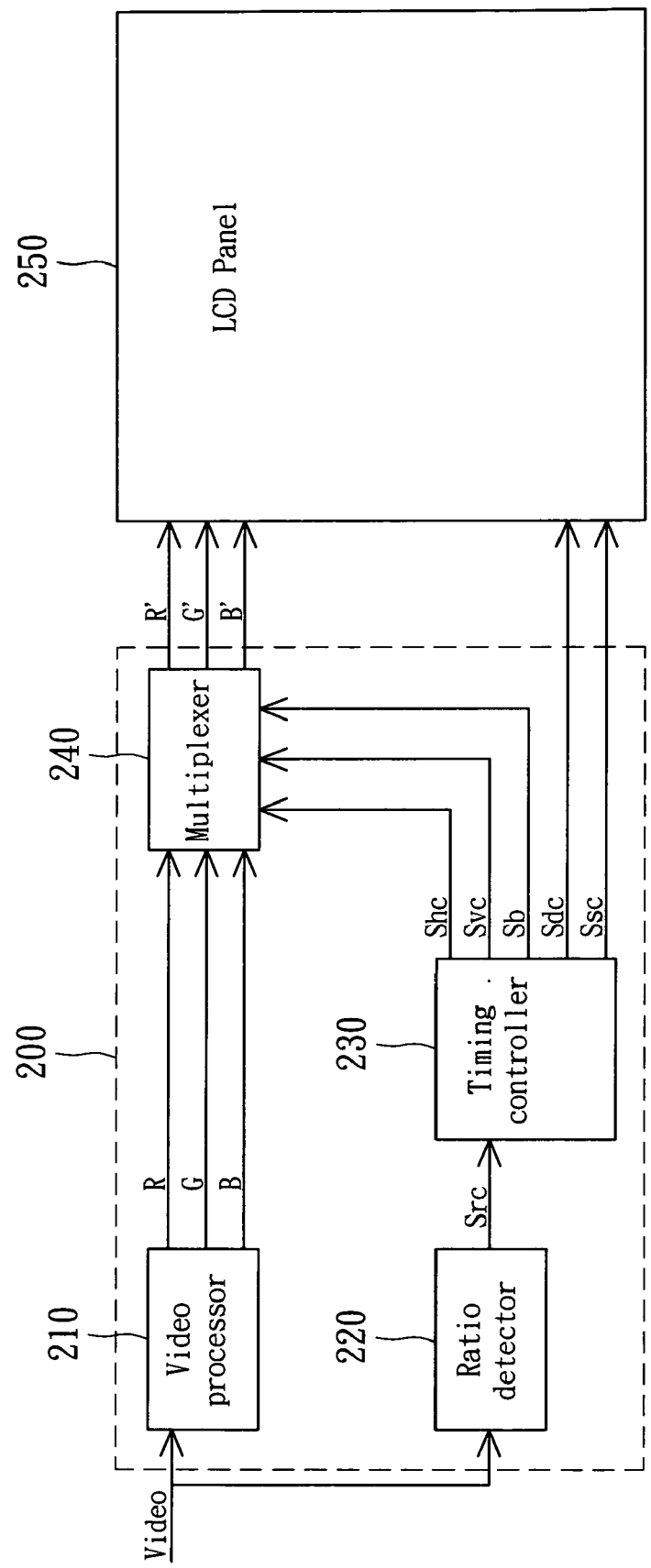
FIG. 2 is a structural diagram of a video processing system chip according to a preferred embodiment of the present invention.

Referring to FIG. 2, a structural diagram of a video processing system chip according to a preferred embodiment of the present invention is shown. The video processing chip 200 receives a video signal Video for outputting an adjusted red image signal R', an adjusted green image signal G' and an adjusted blue image signal B' to an LCD panel 250 to display an image. The video processing chip 200 includes a video processor 210, a ratio detector 220, a timing controller 230 and a multiplexer 240. The video processor 210 receives a video signal Video and accordingly generates a red image signal R, a green image signal G and a blue image signal B. The ratio detector 220 detects the aspect ratio of the video signal Video such as 16:9, 4:3, or 3:2 for instance and outputs a ratio control signal Src according to a ratio setting value K. The ratio setting value K corresponds to a first aspect ratio, a second aspect ratio or a third aspect ratio such as 16:9, 4:3, or 3:2 for instance. The timing controller 230 responds to the ratio control signal Src to output a vertical blanking signal Svc, a horizontal blanking signal Shc and a blanking data signal Sb. The timing controller 230 further outputs a data control signal Sdc and a scan control signal Ssc to the LCD panel 250 according to the ratio control signal Src. The LCD panel 250, under the control of the data control signal Sdc and the scan control signal Ssc, displays an image according to the adjusted red image signal R', the adjusted green image signal G' and the adjusted blue image signal B'.

The multiplexer 240, such as a 3-state gate for instance, receives a blanking data signal Sb, a red image signal R, a green image signal G and a blue image signal B, and under the control of the vertical blanking signal Svc and the horizontal blanking signal Shc, respectively selects the blanking data signal Sb or red image signal R, the blanking data Sb or green image signal G and the blanking data Sb or blue image signal B as the adjusted red image signal R', the adjusted green image signal G' and the adjusted blue image signal B' to be outputted, so that the image displayed on the LCD panel 250 has an aspect ratio corresponding to the ratio setting value K.

The ratio setting value K of the ratio detector 220 can be transmitted to the video processing chip 200 to the chip via an Inter-IC BUS (I2C) signal line from outside the chip. By doing so, the ratio setting value K is set by the user to control the aspect ratio of the LCD panel 250. For example, the user presses a select key of the LCD display to set the ratio setting value K via the I2C signal line. The ratio detector 220 detects the aspect ratio of the video signal Video. For example, the aspect ration can be achieved according to the calculation of the number of horizontal and vertical lines required for the video signal Video to display an image. Besides, the ratio detector 220 can also be used to detect the aspect ratio of the LCD panel 250, so that the invention can be further applied to other LCD panels with an aspect ratio other than 16:9.

Figure 3:
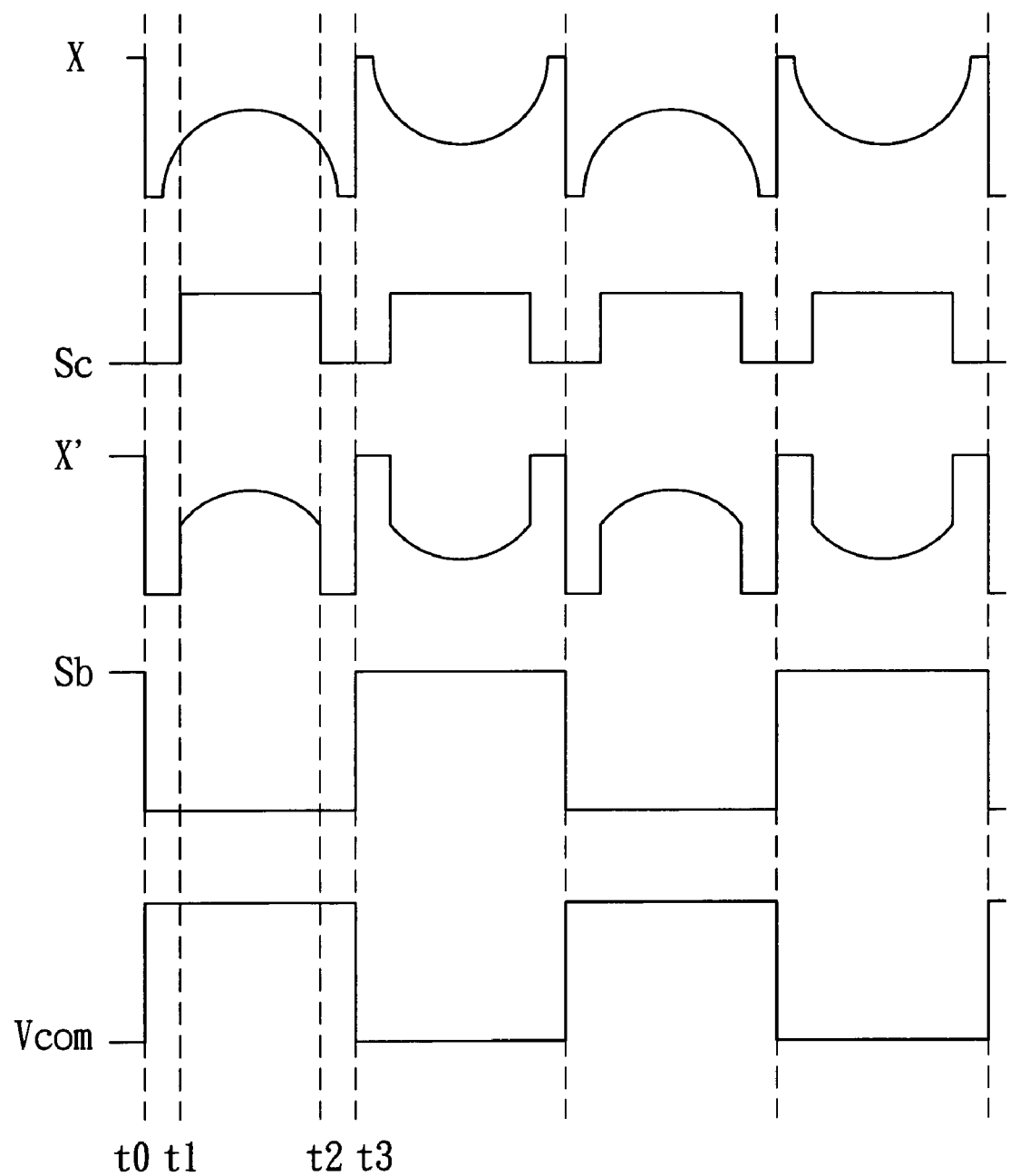
FIG. 3 is a wave diagram of relevant signals when an image with 16:9 aspect ratio is displayed on an LCD panel.
Figure 4A:
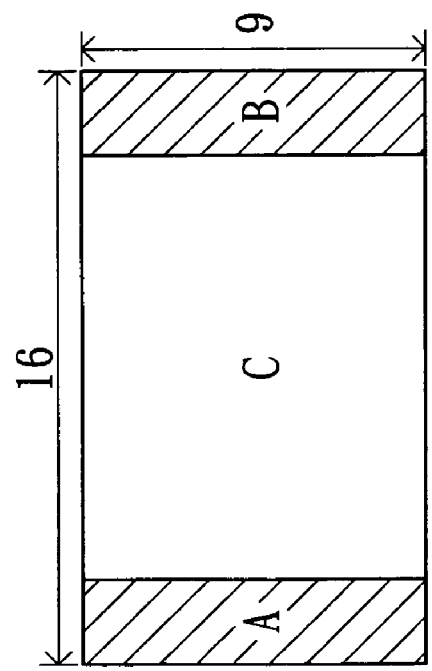
FIG. 4A is a diagram showing a 4:3 image is displayed on a 16:9 display panel.

The vertical blanking signal Svc outputted from the timing controller 230 determines the vertical blanking region of an image the LCD panel 250 displays, such as a display region on the vertical black region for instance, while the horizontal blanking signal Shc determines the horizontal blanking region of an image the LCD panel 250 displays, such as a display region on the horizontal black region for instance. Referring to FIG. 3, an example of a wave diagram of relevant signals when an image with an aspect ratio of 16:9 is displayed on an LCD panel 250 is shown. Referring to FIG. 4A, a diagram showing a 4:3 image is displayed on a 16:9 display panel is shown. When converting an image with the aspect ratio of 16:9 to 4:3, the video processing chip 200 displays a black image on regions A and B, only region C has an image displayed thereon with corresponding signal wave pattern illustrated in FIG. 3. For convenience of explanation, let an image signal X denote one of the three of the red image signal R, the green image signal G and the blue image signal B, and let an adjusted image signal X' denote one of the three of the adjusted red image signal R', the adjusted green image signal G' and the adjusted blue image signal B'. A signal Vcom is a common voltage signal, while the voltage difference between the signal Vcom and the adjusted image signal X' drives of the LCD panel 250 to display image. The signal Sc is the result of the AND operation of the vertical blanking signal Svc and the horizontal blanking signal Shc. In the present embodiment, the vertical blanking signal Svc has the same wave pattern with the signal Sc, while the horizontal blanking signal Shc is constantly remained enabled. From time point t0 to t1, the signal Sc is disenabled, such as at a low level for instance, then the multiplexer 240 uses the blanking data signal Sb as the adjusted image signal X' to be outputted to display a black image on the region A. From time point t1 to t2, the signal Sc is enabled such as at a high level for instance, then the multiplexer 240 uses the image signal X as the adjusted image signal X' to be outputted to display an image on the region C. From time point t2 to t3, the signal Sc is at a low level for instance, then the multiplexer 240 uses the blanking data signal Sb as an adjusted image signal X' to be outputted to display a black image on the region B. Thus, according to the state of the signal Sc, the blanking data Sb or the image signal X can be selected as the adjusted image signal X' to be outputted, so that a black image or a desired image can be displayed on various regions of the LCD panel 250.

Figure 4B:
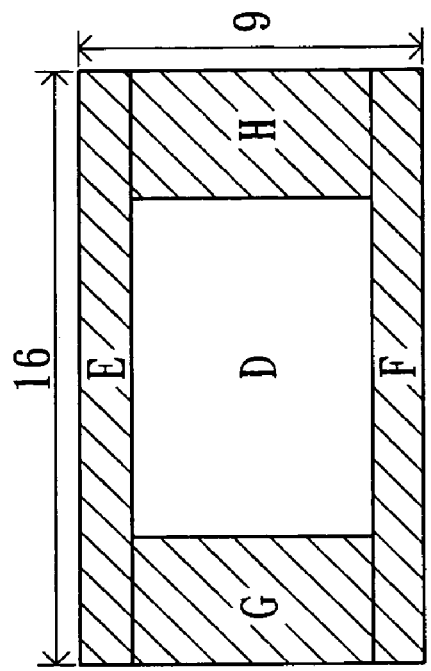
FIG. 4B is a diagram showing a 3:2 image is displayed on a 16:9 display panel.

Referring to FIG. 4B, a diagram showing a 3:2 image is displayed on a 16:9 display panel is shown. When converting an image with the aspect ratio of 16:9 to 3:2, the video processing chip 200 displays black image on several regions E, F, G, and H, and only the region D has an image displayed thereon. When displaying the regions E and F, the horizontal blanking signal Shc is constantly remained disenabled for instance, so that the signal Sc remained disenabled with a black image displayed thereon. When displaying the regions G, D and H, the horizontal blanking signal Shc is constantly remained enabled for instance, so that the vertical blanking signal Svc is a wave-pattern similar to the signal Sc of FIG. 3 and that the signal Sc generate a wave-pattern similar to the signal Sc of FIG. 3 to display an image on the region D.

Figure 5:
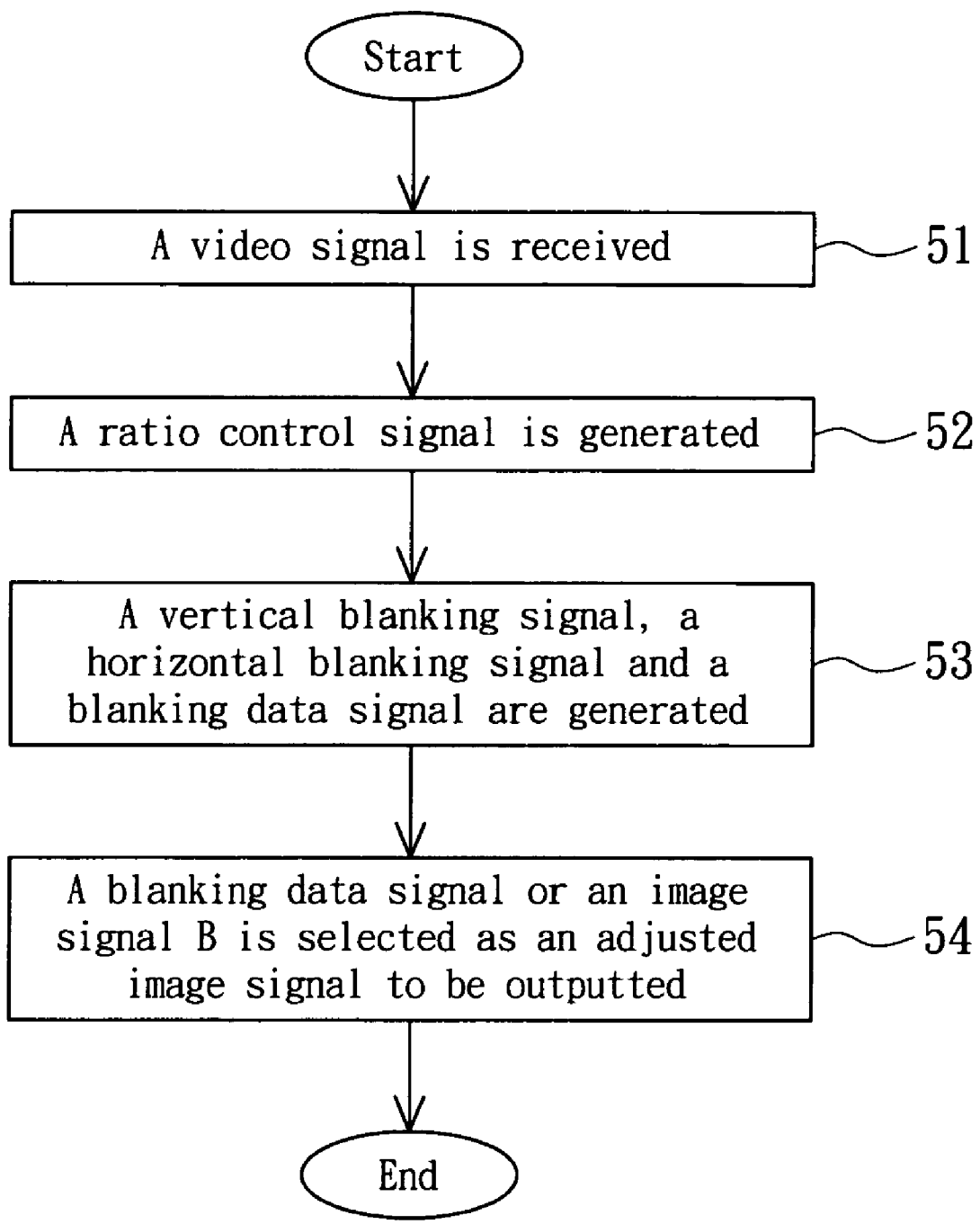
FIG. 5 is a flowchart of a method for displaying an image according to a preferred embodiment of the present invention.

Referring to FIG. 5, a flowchart of a method for displaying an image according to a preferred embodiment of the present invention is shown. The present embodiment provides a method applied in an LCD panel. Firstly, a video signal Video is received and accordingly a red image signal R, a green image signal G and a blue image signal B are generated, and an aspect ratio of the video signal Video is detected as shown in step 51. Next, a ratio control signal Src is generated according to a ratio setting value K as shown in step 52. Then, a vertical blanking signal Svc, a horizontal blanking signal Shc and a blanking data signal Sb are generated in response to a ratio control signal Src as shown in step 53. Lastly, under the control of the vertical blanking signal Svc and the horizontal blanking signal Shc, the blanking data signal Sb or the red image signal R, the blanking data signal Sb or the green image signal G and the data signal Sb or the blue image signal B are respectively selected as an adjusted red R' image signal, an adjusted green image signal G' and an adjusted blue image signal B' to be outputted, so that the image displayed on the LCD panel 250 has an aspect ratio corresponding to a setting value K as shown in step 54.

According to the video processing chip and the method of displaying an image thereby disclosed in the above embodiment of the present invention, the video processor, the timing controller, the ratio detector and the multiplexer for selecting a blank or an image signal to be outputted are incorporated in the video processing chip. The invention only needs one video processing chip to achieve the object of displaying images of various aspect ratio on an LCD panel, reducing not only the size of the circuit board, but also the required manufacturing costs.

While the present invention has been described by way of example and in terms of a preferred embodiment, it is to be understood that the present invention is not limited thereto. On the contrary, it is intended to cover various modifications and similar arrangements and procedures, and the scope of the appended claims therefore should be accorded the broadest interpretation so as to encompass all such modifications and similar arrangements and procedures.

We claim:

1. A video processing chip for receiving a video signal and outputting an adjusted image signal to an LCD panel to display an image, comprises:
   a video processor for receiving the video signal and generating an image signal according to the video signal;
   a ratio detector for detecting an aspect ratio of the video signal and outputting a ratio control signal according to a ratio setting value;
   a timing controller for outputting a vertical blanking signal, a horizontal blanking signal and a blanking data signal in response to the ratio control signal; and
   a multiplexer for receiving the blanking data signal and the image signal and selecting the blanking data signal or the image signal as the adjusted image signal according to the vertical blanking signal and the horizontal blanking signal to be outputted, so that the image has the aspect ratio corresponding to the ratio setting value.

2. The chip according to claim 1, wherein the image signal comprises a red image signal, a green image signal, a blue image signal, or a combination thereof.

3. The chip according to claim 1, wherein the adjusted image signal comprises a red image signal, a green image signal, a blue image signal, or a combination thereof.

4. The chip according to claim 1, wherein the ratio setting value is transmitted to the chip via an Inter-IC BUS (I2C) signal line from outside the chip.

5. The chip according to claim 1, wherein the ratio detector is configured to detect the aspect ratio of the LCD panel.

6. The chip according to claim 1, wherein the ratio detector is configured to obtain the aspect ratio of the video signal according to the calculation of the number of horizontal lines and vertical lines required for the video signal to display the image.

7. The chip according to claim 1, wherein the aspect ratio of the video signal is substantially 16:9, 4:3, or 3:2.

8. The chip according to claim 1, wherein the ratio setting value is substantially 16:9, 4:3, or 3:2.

9. The chip according to claim 1, wherein the vertical blanking signal and the horizontal blanking signal, respectively, determine the vertical blank display region and the horizontal blank display region of the image.

10. The chip according to claim 1, wherein the multiplexer comprises a 3-state gate.

11. A method for displaying an image using a video processing chip capable of adjusting an aspect ratio, comprising:
    receiving a video signal, generating an image signal according to the video signal, and detecting the aspect ratio of the video signal;
    generating a ratio control signal according to a ratio setting value;
    generating a vertical blanking signal, a horizontal blanking signal and a blanking data signal in response to the ratio control signal; and
    selecting the blanking data signal or the image signal as an adjusted image signal to be outputted under the control of the vertical blanking signal and the horizontal blanking signal, so that the image has the aspect ratio corresponding to the ratio setting value.

12. The method according to claim 11, wherein the image signal comprises a red image signal, a green image signal, a blue image signal, or a combination thereof.

13. The method according to claim 11, wherein the adjusted image signal comprises a red image signal, a green image signal, a blue image signal, or a combination thereof.

14. The method according to claim 11, wherein the ratio setting value is outputted via an I2C signal line.

15. The method according to claim 11, wherein the ratio setting value is set manually.

16. The method according to claim 11, wherein in the step of detecting the aspect ratio of the video signal, the aspect ratio of the video signal is obtained according to the calculation of the number of horizontal lines and vertical lines required for the video signal to display the image.

17. The method according to claim 11, wherein the aspect ratio of the video signal is substantially 16:9, 4:3, or 3:2.

18. The method according to claim 11, wherein the aspect ratio is substantially 16:9, 4:3, or 3:2.

19. The method according to claim 11, wherein the vertical blanking signal and the horizontal blanking signal, respectively, determine the vertical blank display region and the horizontal blank display region of the image.

* * * * *